J. H. HOLLOWAY.
PNEUMATIC LIFTING JACK.
APPLICATION FILED JAN. 19, 1916.
1,248,861. Patented Dec. 4, 1917.
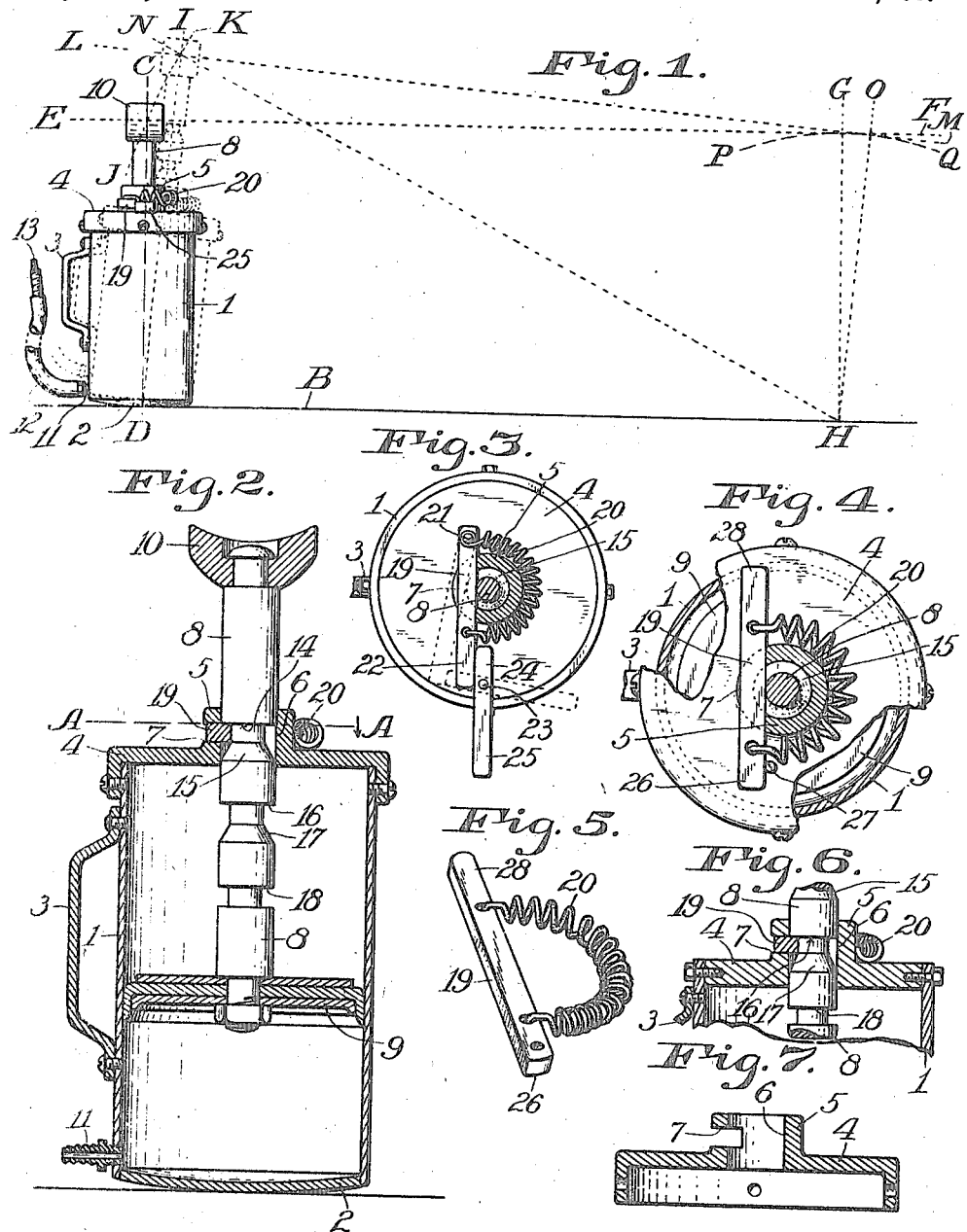
WITNESSES:
J. H. Gardner
M. E. Sparrow
INVENTOR:
John H. Holloway
BY
E. T. Silvius,
ATTORNEY.

UNITED STATES PATENT OFFICE.

JOHN H. HOLLOWAY, OF LA FAYETTE, INDIANA.

PNEUMATIC LIFTING-JACK.

1,248,861. Specification of Letters Patent. Patented Dec. 4, 1917.

Application filed January 19, 1916. Serial No. 73,043.

*To all whom it may concern:*

Be it known that I, JOHN H. HOLLOWAY, a citizen of the United States, residing at La Fayette, in the county of Tippecanoe and State of Indiana, have invented a new and useful Pneumatic Lifting-Jack, of which the following is a specification, reference being had to the accompanying drawings and to the letters and figures of reference marked thereon.

This invention relates to the type of lifting-jack that is designed to be operated by means of fluid pressure, and more especially by means of compressed air to be supplied by an air compressor or pump separately from the lifting-jack, the invention having reference more particularly to a pneumatic lifting-jack that is particularly adapted for lifting the wheels of automobiles or other vehicles clear of the ground or shop floor and support the axle of the vehicle to permit the wheel or the tire thereof to be removed, more especially when tire repairs are required.

An object of the invention is to provide a substantial and relatively inexpensive lifting-jack of such construction as to be especially reliable and convenient for use in shops, garages, or elsewhere for lifting and supporting either end portion of an automobile axle to permit convenient replacement or repair of the pneumatic tire of the adjacent wheel.

Another object is to provide a pneumatic lifting-jack of such construction as to be thoroughly reliable in operation and not liable to accidentally lower its load with possible damage thereto in case the vehicle wheel is removed, which jack shall be of light weight and not liable to accidental injury, and convenient to be carried as part of an automobile equipment to be operated by compressed air which may be supplied from a compressor or storage reservoir with which the automobile may be provided.

With the above-mentioned and other objects in view, the invention consists in a pneumatic lifting-jack having novel features of construction, more particularly with reference to locking means for preventing accidental lowering of the load on the jack; the invention consisting also further in the parts, and combinations and arrangements of parts, as hereinafter particularly described and further defined in the accompanying claims.

Referring to the drawings, Figure 1 is a side elevation of the improved jack, broken lines indicating the approximate position of the jack on lifting one end portion of the vehicle axle; Fig. 2 is a vertical central sectional view of the jack; Fig. 3 is a sectional plan approximately on the plane of the line A A on Fig. 2; Fig. 4 is a sectional plan also on the line A A and partially broken away, the jack being slightly modified; Fig. 5 is a perspective view of a locking appliance for securely supporting the ram of the jack when elevated; Fig. 6 is a fragmentary central section showing the preferred form of construction of the upper portion or top of the jack body; and, Fig. 7 is a central section of a slightly modified form of body top corresponding to that shown in Figs. 1, 2 and 4.

Similar reference characters on the different figures of the drawings indicate corresponding elements or features of construction herein referred to.

A practical embodiment of the invention comprises a hollow cylindrical main part 1 having a bottom or base 2 that has a rounded or convex under face to enable the jack to be turned over from a vertical to an inclined position when in use, in order to permit smooth operation of the jack without there being a tendency of the jack to slip from under its load. Preferably the exterior of the main part is provided with a handle 3. The main part of the jack is provided with a head or top member 4 which may be connected to the normal upper end of the cylindrical portion of the main part by various approved means, so as to be substantial and capable of withstanding the load that may be required of it. The top of the head 4 has a central boss 5 thereon in which is a guide bore 6 that extends through the head. One side portion of the boss has a slot 7 therein that extends horizontally from the exterior of the boss to the bore to receive a locking-bar. The lifting-ram comprises a cylindrical rod 8 that is movably guided in the bore 6, the normal lower end of the rod being in the cylindrical main part and having a suitable packing piston 9 connected thereto that is closely fitted to the wall of the main part, the upper end of the rod having a saddle 10 thereon. The lower portion of the main part has a nipple 11 connected thereto to which a flexible hose 12 is connected, the hose being provided with a well-known type of inflation tube and valve 13 similar to that with which a pneumatic tire is provided, so that an inflation pump or connection may be connected thereto for supplying compressed air or compressing air in the lower portion of the main part to force up the piston, the inflation valve being available for use to permit the air to escape when it is desired to lower the ram. The rod 8 has a suitable number of circumferential grooves in its periphery to receive a locking-bar, one groove forming a downward facing shoulder 14, the opposite side of the groove being conically inclined to form a wedge-like face 15 for forcing the locking-bar out of the groove on upward movement of the rod. The rod has also another similar groove which forms a downward facing shoulder 16 and a wedge-like upwardly facing inclined shoulder 17, and lower down the rod has a downwardly facing shoulder 18 formed preferably by grooving the rod. A locking-bar 19 is movably arranged in the slot 7 and extends horizontally beyond the boss 5 to be engaged in order to withdraw the locking-bar outward, the locking-bar being automatically drawn inward by means of a coil spring 20 that has its opposite ends connected to the locking-bar, the spring embracing the exterior of the opposite portion of the boss. In some cases one end portion of the locking-bar is connected to the head 4 by means of a pivot 21, the opposite end of the locking-bar being extended so as to constitute a lever arm 22, and while this may in some cases be moved by hand, preferably the head 4 is provided with a pivot 23 to which a lever is connected between its ends so as to have a short arm 24 for engagement with the arm 22 and a relatively longer arm 25 to be operated by hand, so that a compound lever is provided for retracting the locking-bar. In some cases the shorter end portion 26 of the locking-bar may operate in connection with a pivot pin 27 secured to the head 4, the locking-bar having a relatively longer opposite end extension 28 to be engaged by hand for retracting the locking-bar. In some cases the locking-bar may extend beyond the pivot pin 27 so that it may be engaged by hand, such arrangement being permissible in the smaller sizes of jacks, so that with a relatively weaker spring 20 the two ends of the locking-bar may be simultaneously pushed back to retract the locking-bar from the shoulder of the rod 8 with which it may be in contact.

It should be understood that various modifications in the details of construction may be made as may be found desirable, within the scope of the appended claims.

In practical use the lifting-jack may be used for lifting the axle of a vehicle on an available foundation, as on a floor or on the ground where the vehicle may be. Referring to Fig. 1, B indicates the plane of the foundation, the jack being set thereon so that the rod 8 is approximately on a vertical plane C D, the broken line E F representing the horizontal axle to be lifted near one wheel while supported by the opposite wheel thereof which at rest is on the vertical plane of the line G H. The locking-bar 19 is held by its spring against the side of the rod 8 and on forcing the piston upward until the shoulder 14 passes the locking-bar, the locking-bar is automatically drawn inward under the shoulder. If the axle is sufficiently elevated the operation may be stopped, but if further elevation is necessary the air is caused to further raise the piston and the rod, the latter carrying the wedge-like face 15 against the locking-bar and pushing the latter out of the groove, the operation being continued until the locking-bar is drawn into another groove and engages the stop shoulder so as to securely hold the ram in elevated position even though the air pressure below the piston decreases or becomes exhausted through leakage. As the rod is forced upward it is drawn over to an inclined angle corresponding approximately to the line D I, consequently causing the bottom 2 of the main part to slightly roll on the foundation or floor B. While the jack is being tilted a point in the saddle 10 follows the arc J K until the axle is carried up to the required height, as on the plane of the line L M, H M being the radius of the arc J K with H as the center. The jack while being operated obviously is tilted over and the saddle drawn toward the plane G H because of the supporting wheel being tilted from the plane G H approximately to the plane H O, a point in the wheel hub passing along the arc P Q with H as the center of oscillation. From the foregoing the importance of the rounded bottom 2 of the jack will be readily apparent.

Having thus described the invention, what is claimed as new is—

1. A pneumatic lifting-jack comprising a hollow cylindrical main part, a supporting bottom fixed to the normal lower end portion of the main part, a bored head fixedly secured to the upper end portion of the main part, a lock bar movably guided upon the head adjacent to the bore thereof, a notched rod movable in said bore to be engaged by the lock bar, a coil spring connected at its ends to the lock bar adjacent to opposite sides respectively of the bore of the head and extending about the bore, the spring engaging a portion of said head to yieldingly draw the lock bar to said rod, a piston in the main part fixed to said rod, and an air-duct connected with the main part adjacent to the supporting bottom.

2. A pneumatic lifting-jack comprising a hollow cylindrical main part, a supporting bottom fixed to the normal lower end portion of the main part, a head fixedly secured to the upper end portion of the main part and having a boss on the top thereof and a guide bore extending through the head and the boss, the wall of the boss having a horizontal slot extending through one side thereof, a lock bar movably guided in the slot and extending beyond the adjacent portions of the boss, a spring supported on a portion of the head and engaging the lock bar to yieldingly hold the lock bar in the slot, a piston movable in the main part, a rod secured to the piston and extending through the guide bore in contact with the lock bar, the rod having notches in its side to separately receive the lock bar for support, a saddle on the top of the rod, and an air-duct connected with the main part adjacent to the supporting bottom.

3. A pneumatic lifting-jack comprising a hollow cylindrical main part, a supporting bottom fixed to the normal lower end portion of the main part, a head fixedly secured to the upper end portion of the main part, the head having a guide bore therein, a lock bar pivoted to the top of the head and movable adjacent to the guide bore, said bar having a projecting arm, a notched rod movable in said bore to be engaged by said bar, a spring supported on a portion of said head and engaging said bar to yieldingly hold it to said rod, a piston in the main part fixed to said rod, an air-duct connected with the main part adjacent to the supporting bottom, and a controlling lever pivotally connected between its ends to the top of said head and having one of its end portions in contact with the arm of said lock bar to oppose the action of said spring, the opposite end portion of said lever extending beyond said head.

4. A pneumatic lifting-jack comprising a hollow cylindrical main part, a supporting bottom fixed to the normal lower end portion of the main part and having a convex under face, a head fixedly secured to the upper end portion of the main part and having a boss on the top thereof and a guide bore extending through the head and the boss, the wall of the boss having a horizontal slot extending through one side thereof, a lock bar movably guided in the slot and extending beyond the adjacent portions of the boss, a coil spring connected at its ends to the lock bar adjacent to the opposite sides of the slot and extending about the opposite side of the wall of the boss in contact therewith to yieldingly hold the lock bar in the slot, a piston movable in the main part, a rod secured to the piston and extending through the guide bore in contact with the lock bar, the rod having circumferentially-extending grooves therein to separately receive the lock bar for support, the lower wall of one of the grooves being conical to force the lock bar from the groove on upward movement of the rod, a saddle on the top of the rod, and an air-duct connected with the main part adjacent to the supporting bottom.

In testimony whereof, I affix my signature, in presence of two witnesses.

JOHN H. HOLLOWAY.

Witnesses:
EMMA L. RESER,
SEPTIMIUS VATER.